Patented Mar. 22, 1927.

1,621,725

UNITED STATES PATENT OFFICE.

HENRY A. HILLS, OF GRAND RAPIDS, MICHIGAN.

FILTERING MATERIAL AND METHOD OF PREPARATION THEREOF.

No Drawing. Application filed July 3, 1920. Serial No. 393,957.

This invention relates to a new and improved filtering material and the method of preparation thereof.

The specific method of preparing the membrane used in the filter described and claimed in the aforesaid case is herein set forth.

It is the object of this invention to provide a filtering material especially for use with hydro-carbons, as gasoline and the like which shall be absolutely impervious to water.

It is a further object of the invention to provide a filtering material which is simply and easily prepared, is made of inexpensive materials, and which therefore can be readily and cheaply manufactured.

It is still another object of the invention to provide a filtering material which does not easily clog up and which will operate efficiently for an indefinite length of time.

Other and further important objects of the invention will be apparent from the following description and specification.

The invention (in a preferred form) is hereinafter more fully described.

Process:

I have found by a series of experiments that a fabric impregnated with an essential oil will permit the passage therethrough of a hydrocarbon oil but will effectually exclude water. Further experiment has shown that the best and most efficient method of impregnating the fabric with an essential oil is to mix the essential oil with a mineral oil or any other substance which possesses the property of penetrating the fibres of the fabric more readily than the essential oil itself.

One particular method of preparation of the improved membrane consists of soaking a fabric which is preferably closely woven, such as cotton flannel or the like, in a mixture of oil of citronella and kerosene for a period of time of approximately one month or more.

The essential oil or oil of citronella renders the fabric impervious to water, and the purpose of the kerosene or mineral oil is to make the oil of citronella more fluid and to aid in the penetrating of the fibres of the cloth by the essential oil or oil of citronella.

The oil of citronella used is commercially available and consists mainly of geraniol, citronellal, camphene, dipentene, limonene, and traces of linalool, borneol, methyl heptenone, methyl eugenol, and sesquiterpenes.

I have found that some of these substances, or all of them, or their combination, render a fabric impregnated therewith impervious to water, but permitting of the passage therethrough of certain other fluids, in this case hydrocarbons, especially those of the lighter series, as gasoline, the treated fabric acting in this case in a manner similar to the semi-permeable membranes used in demonstrations and experiments relating to osmotic pressure, or the membranes used in dialysis, which is the separation of crystalloids from colloids, these membranes, as is well known, permitting the passage therethrough of the molecules of one substance but effectually excluding the passage of the molecules of some other substance.

The addition of the oil of citronella to a fabric also hastens the penetration of a hydrocarbon oil, probably because a film of oil of citronella hinders surface absorption of the hydrocarbon oil and facilitates its passage along the surfaces by capillarity.

Herein is provided a filter for gasoline which effectively and positively excludes the passage of water therethrough and which is not affected by long usage and which is neither contaminated nor stopped up by any iron oxides or other impurities ordinarily present in water usually held in suspension in gasoline.

This membrane I have found to be very superior to the chamois-skin membranes ordinarily used as in a recently conducted test one thousand gallons of commercial gasoline were filtered through chamois skin and no water was separated and then the same gasoline was filtered through a piece of canton flannel treated in the manner above described, and 15 to 20 gallons of water were separated red with iron oxides from the tanks.

This membrane is further superior to others in that no fine fuzz or bits of cloth or chamois is given off which tends to clog the jet of the carbureter.

I am aware that numerous other oils and materials may be used through a wide range without departing from the principles of this invention and I therefore do not purpose limiting the patent granted otherwise than necessitated by the prior art.

I claim as my invention:

1. A water proof filtering material comprising a flannel cloth impregnated with oil of citronella.

2. The method of preparing a water proof filter which consists of saturating a flannel cloth with a solution of kerosene and oil of citronella.

3. The method of preparing a water proof filter which consists of saturating a flannel cloth with a solution of kerosene and oil of citronella and allowing the said cloth to remain in the oil mixture for approximately 30 days.

In testimony whereof I have hereunto subscribed my name.

HENRY A. HILLS.